(12) United States Patent
Smith (10) Patent No.: US 7,294,181 B1
(45) Date of Patent: Nov. 13, 2007

(54) AIR FILTRATION AND POSITIVE PRESSURIZATION SYSTEM FOR VEHICLES IN ENVIRONMENTALLY ADVERSE CONDITIONS

(75) Inventor: Mark C. Smith, Mt. Airy, MD (US)

(73) Assignee: Marcor Management, Inc., Hunt Valley, MD (US)

( * ) Notice: Subject to any disclaimer, the term of this patent is extended or adjusted under 35 U.S.C. 154(b) by 238 days.

(21) Appl. No.: 10/897,418

(22) Filed: Jul. 23, 2004

Related U.S. Application Data (60) Provisional application No. 60/489,503, filed on Jul. 24, 2003.

(51) Int. Cl.
*B01D 50/00* (2006.01)

(52) U.S. Cl. .................. 96/397; 96/421; 55/385.2; 55/385.3; 55/471

(58) Field of Classification Search ............... 55/385.3, 55/467, 471, 385.2; 96/397, 421
See application file for complete search history.

(56) References Cited

U.S. PATENT DOCUMENTS

| | | | |
|---|---|---|---|
| 4,612,975 A * | 9/1986 | Ikari | ............... 165/43 |
| 5,119,718 A * | 6/1992 | Wagner et al. | ............... 454/158 |
| 6,383,241 B1 * | 5/2002 | Janus et al. | ............... 55/385.2 |
| 6,979,359 B2 * | 12/2005 | Laiti | ............... 55/356 |

OTHER PUBLICATIONS

"Solar Powered Exhaust Fan",: http://cysg.com.fan.htm; Oct. 27, 2004, Chang Yuan International Pte. Ltd.
"DOE Standard: Specification for HEPA Filters Used by DOE Contractors"; U.S. Dept. of Energy, Washington, D.C. 20585, Jan. 1997.

* cited by examiner

*Primary Examiner*—Robert A. Hopkins
(74) *Attorney, Agent, or Firm*—Roylance, Abrams, Berdo & Goodman, L.L.P.

(57) ABSTRACT

A system and method for providing filtered and pressurized air into a vehicle cab, enclosure or other interior enclosed environment is described, in which a filtered positive pressure air unit comprises a sealed box, a HEPA filter, a blower, a magnahelic, power source and ductwork. Dirty air is drawn by the blower through the hose and ductwork to the HEPA filter where a certain percentage of impurities of a certain size or larger are removed. Clean air is discharged at a sufficiently high rate to create a positive pressure inside the interior enclosed environment, keeping clean air in, and dirty air out.

11 Claims, 7 Drawing Sheets

AIR FILTRATION AND POSITIVE PRESSURIZATION SYSTEM FOR VEHICLES IN ENVIRONMENTALLY ADVERSE CONDITIONS

PRIORITY

The present application claims priority under 35 U.S.C. § 119(e) to U.S. Provisional Patent Application Ser. No. 60/489,503, filed Jul. 24, 2003, the entire contents of which are expressly incorporated herein by reference.

BACKGROUND OF THE INVENTION

1. Field of the Invention

The invention is related air filtration systems. More particularly, the invention is related to a system and method for filtering air from an exterior environment for use in an interior enclosed environment, so that environmentally harmful materials are prevented from entering the interior enclosed environment, and thus making it safe for the occupants of the interior enclosed environment.

2. Background of the Invention

There are many situations in which workers are asked to perform certain jobs, which, of their own accord are hazardous. These include operating heavy lift equipment in construction or mining operations, operating earth moving equipment, such as trucks, in the same areas, and then there are other situations in which, while the task is not necessarily unusually perilous, the environment can make is so.

Examples of the former include operating dump trucks to move large amounts of earth in or near mining operations. Such facilities can be dusty, from ordinary dirt, but also dusty with dangerous compounds, such as coal dust, wood dust and other particulate matters that are dangerous in large quantities to the human body. Workers in these environments often have to suffer through unpleasant and in some cases dangerous work environments due to the absence of safer, less costly alternatives to their present vehicular "tools".

An example of the latter, which has recently been brought to the forefront of our national attention, include the "ordinary" fire and rescue personnel who have to respond to fires, and thus risk being exposed to significant amounts of dangerous (or even toxic) smoke. There is also the possibility that these rescue situations were brought about maliciously by people with political goals, in order to inspire terror in the citizenry of the locale in which the attack occurred. These situations can include not only the aforementioned dangerous or toxic smoke and other particulate matters, but biological and nuclear agents, that can cause the emergency responders to be hampered in their jobs, thereby multiplying the lethality of the first strike.

Thus, a need exists for not only manufacturers, mining and constructions workers to be protected from adverse environmental conditions, but also police, fire and other rescue workers to be protected in accidental or otherwise emergency situations. Furthermore, there exists a need for the system that makes the vehicles safe to operate in these adverse conditions to be less costly, more efficient, easier to maintain and operate than existing devices. In addition, there exists the need for the same system to be made available to the average citizen for personal use in the event that widespread deliberate attacks or natural disasters occur, and they can safely secure a small facility in their residence, allowing them some respite for a certain period of time, which can be the difference, literally, between life and death.

SUMMARY OF THE INVENTION

An object of the present invention is to substantially solve at least the above problems and/or disadvantages and to provide at least the advantages described below.

Accordingly, it is an object of the present invention to provide a system and method for providing filtered and pressurized air into a vehicle cab, enclosure or other environment, in which a filtered positive pressure air unit comprises a sealed box, a hose, a HEPA filter, a blower, a magnahelic, power source and ductwork. Dirty air is drawn by the blower through the hose and ductwork to the HEPA filter, where a certain percentage of impurities of a certain size or larger are removed. Clean air is discharged at a sufficiently high rate to create a positive pressure inside the vehicle cab, enclosure or other environment, keeping clean air in, and dirty air out.

BRIEF DESCRIPTION OF THE DRAWINGS

The novel features believed characteristic of the invention are set forth in the appended claims. The invention itself, however, as well as other features and advantages thereof will be best understood by reference to the detailed description of the preferred embodiments which follows, when read in conjunction with the accompanying drawings, in which:

DETAILED DESCRIPTION OF THE PREFERRED EMBODIMENTS

Several embodiments of the present invention will now be described in detail with reference to the annexed drawings. In the drawings, the same or similar elements are denoted by the same reference numerals even though they are depicted in different drawings.

Figure 1:
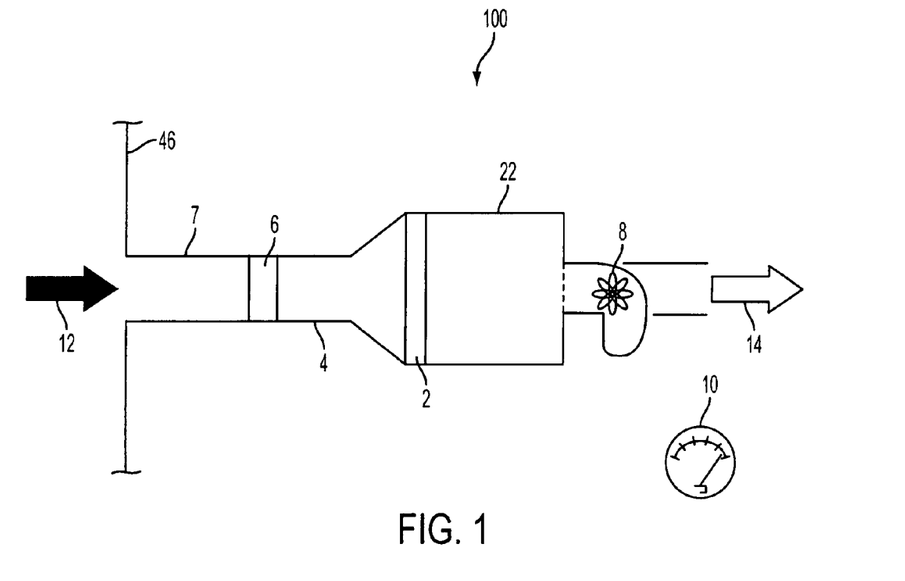
FIG. 1 illustrates a block diagram of an air filtration and positive pressurization system in accordance with an embodiment of the invention.
Figure 2:
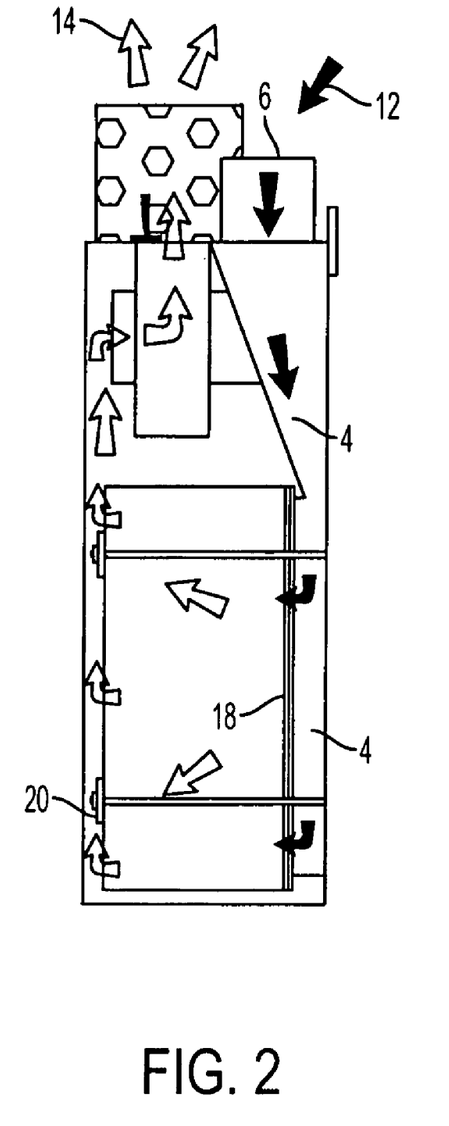
FIG. 2 illustrates a side perspective view of the air filtration and positive pressurization system in accordance with an embodiment of the invention.
Figure 3:
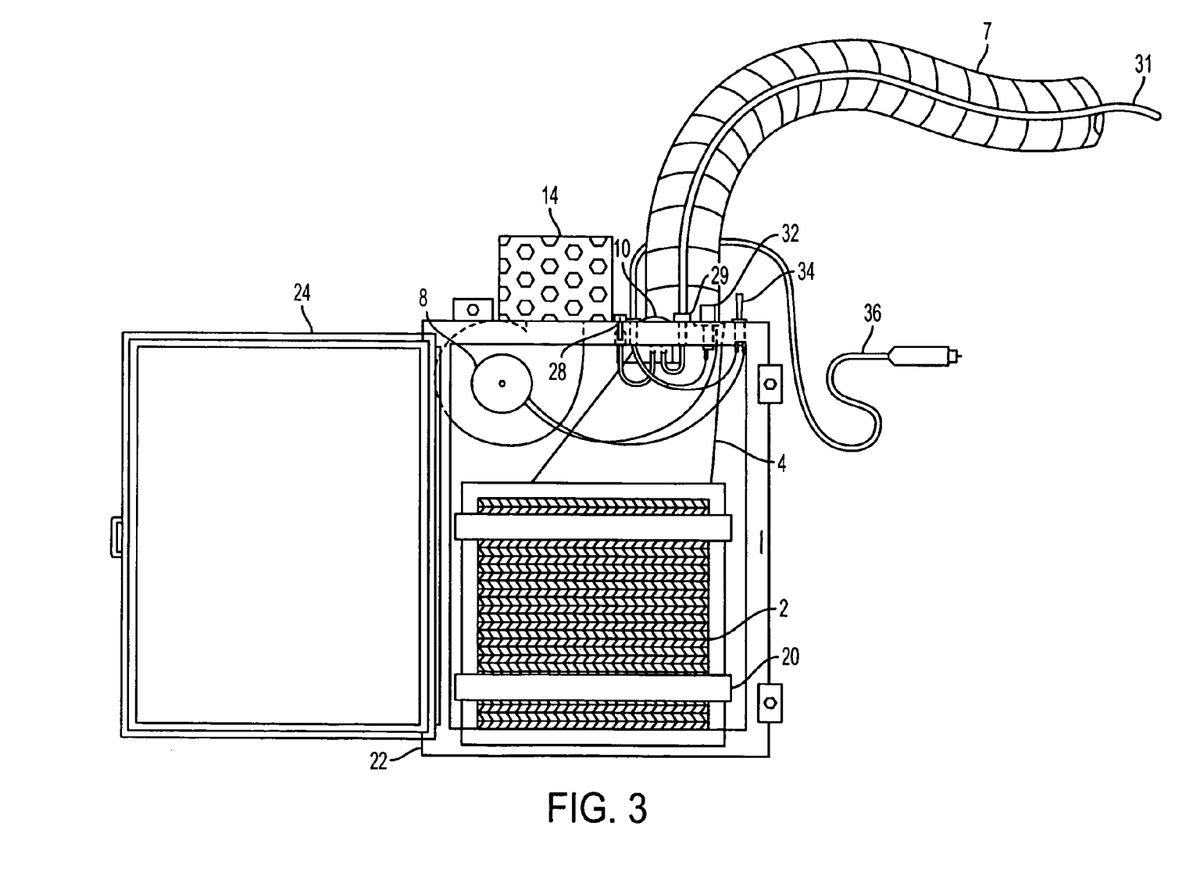
FIG. 3 illustrates a front perspective view of the air filtration and positive pressurization system in accordance with an embodiment of the invention.
Figure 4:
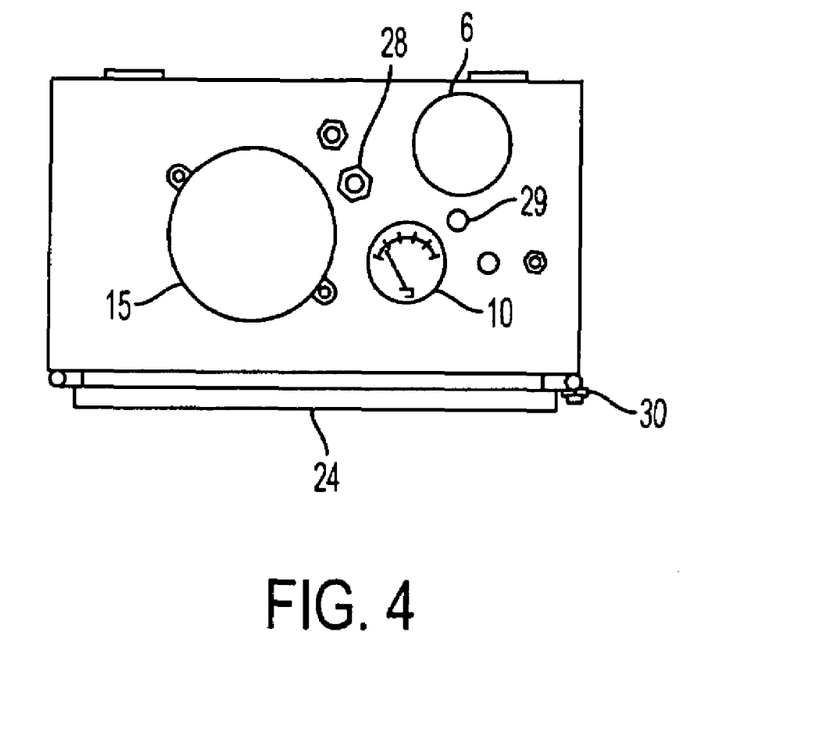
FIG. 4 illustrates a top perspective view of the air filtration and positive pressurization system in accordance with an embodiment of the invention.

FIG. 1 illustrates a block diagram of the air filtration and positive pressurization system (filtered positive pressure air unit) 100 in accordance with an embodiment of the invention, and FIGS. 2-4 illustrate various perspective views of one exemplary embodiment of the air filtration system 100.

The filtered positive pressure air unit 100 utilizes a high efficiency particulate air (HEPA) filter, which is well known to those skilled in the art as an effective means for filtering unwanted materials, biological organisms and even nuclear materials from the air. As such, HEPA filters are used in a variety of applications and corresponding facilities, including hospitals, various types of manufacturing facilities, nuclear energy plants, and facilities wherein air borne pathogens exist.

As discussed above, HEPA filters are used in a variety of applications and facilities. One such type of facility are nuclear facilities licensed by the Department of Energy (DOE). The DOE has therefore produced a standard, DOE-STD-3020-97, the entire contents of which are herein incorporated by reference, which provides guidance to DOE contractors for testing and procurement of HEPA filters used in the DOE nuclear facilities, and establishes specification and testing requirements for the HEPA filters procured to provide personnel and environmental protection. Although it is but one example of a standard concerning HEPA filters, it provides useful information regarding the testing and use of such filters.

Attention is directed towards FIGS. 1-4. The filtered positive pressure air unit 100 is designed to create positive pressure inside the cab of a truck, excavator, front end loader or other equipment with a sealed cab for the purpose of keeping out hazardous or other type of dust particles that could normally enter the cab when not under positive pressure for the protection of the operator of such equipment.

As discussed above, however, there are a variety of other applications which can utilize the unique properties of the filtered positive pressure air unit 100. These include use by fire and rescue personnel at the scene of a fire or terrorist event, use in the home by citizens in the event of natural disasters (for example, to filter ash from a proximately located erupting volcano), terrorist strikes (which can include biological and radiological releases, fires, explosions of chemical facilities, the planned release of harmful chemicals, and so on) and any other incident in which it might be necessary to filter air.

In one such exemplary use, fire and rescue personnel can have the filtered positive pressure air unit 100 installed in their fire engine trucks or emergency vehicles. When responding to a potentially hazardous site, the units can be operated, providing safe, clean air to breathe while approaching and entering the site. There, the emergency and rescue personnel can safely assess the situation from their vehicles, and, if necessary, don their personal protective gear before exiting the vehicles. This can provide an enormous advantage that is not otherwise normally available. The emergency and rescue personnel can then be safely protected while assessing the situation, allowing them the time and comfort to make unhurried decisions as to best approach and deal with the situation on hand, without having to drive to a site in the potentially vision impairing personal protective gear. This provides an additional margin of safety, both while responding to the event, and by not using their precious self-contained breathing resources while en route, giving them more time on scene.

The following paragraphs describe one particular embodiment of a filtered positive pressure air unit 100, and, as such, is not meant to be considered in a limiting manner. Many other embodiments are possible, and can all be considered to fall within the scope of the claims appended below. The filtered positive pressure air unit 100 comprises a sealed steel box (box) 22. In one exemplary embodiment, this box 22 measures only 16" wide, 20" high and 8" deep. A steel door 24 with a rubber gasket seals the interior of the box 22 with an air tight and weather resistant seal. Housed in the box 22 is a 12"×12" HEPA filter 2, a blower 8, magnahelic gauge 10, positive pressure port 28, fuse holder 32, and an on/off switch 34.

The HEPA filter 2 has a gasket 18 on the bottom side that seals the filter 2 to a steel frame that is set on edge and is welded to the bottom of the box 22. The HEPA filter gasket 18 is pressed against the edge of the steel frame and creates a seal when the HEPA filter anchors 20 are tightened by appropriately sized lock nuts. A 3 inch air intake port 6 is secured to the top of the box 22. In this particular embodiment, a 12 volt, 150 cubic feet per minute (cfm) blower 8 is mounted on the underside of the top of the box 22. A magnahelic gauge 10, which measures the air pressure inside the cabin of the vehicle (in this embodiment, or enclosure in other embodiments), fuse holder 32, on/off switch 34, power cord 36 and positive pressure port 28 are all mounted on top of the box 22. The power cord 36 is designed to fit into a cigarette lighter outlet. A 3 inch diameter hose 7 will lead from the 3 inch air intake port 6 to the window on the passenger side of the cab. This can be seen more clearly in reference to FIG. 5.

The magnahelic gauge 10 has two ports: a positive (high) pressure port 28 and a low pressure port 29. These are shown in FIGS. 3 and 4. The low pressure port 29 is connected to an ambient pressure tube 31 that allows the external environment ambient air pressure to be measured by the magnahelic gauge 10. The ambient pressure tube 31 therefore is configured to go to the exterior environment. In the embodiment of the present invention as shown in FIGS. 3 and 4, the ambient pressure tube 31 is attached to hose 7 and is then attached to a hole in window-sealer 46. By sensing both the ambient air pressure of the external environment via the low pressure port 29 and the air pressure of the internal enclosed environment via positive pressure port 28, the magnahelic gauge 10 determines the difference between the two and displays that differential pressure. Therefore, any positive pressure reading on the magnahelic gauge 10 indicates a higher air pressure in the interior environment than the external environment. Typically, the magnahelic gauge 10 can measure a pressure differential in the range of 0-2 inches of water column (inches WC); in one embodiment of the present invention, the positive pressure reading is in the range of 0.5 to 0.7 inches WC.

Figure 5:
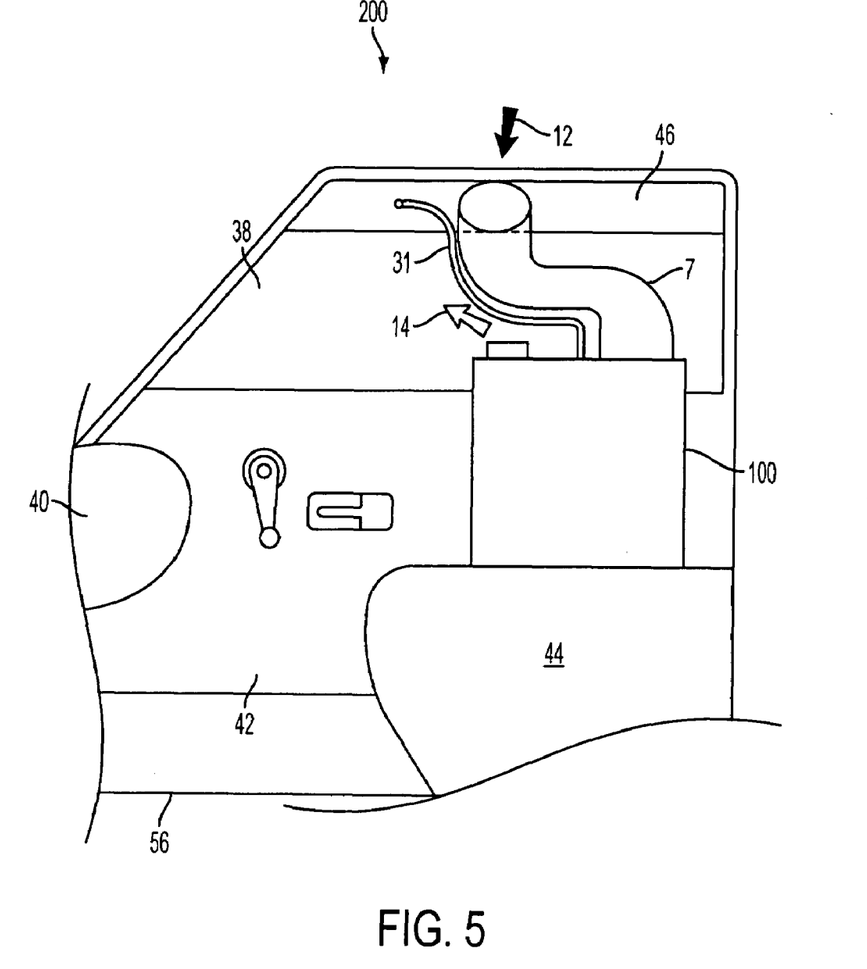
FIG. 5 illustrates a first exemplary use of the air filtration and positive pressurization system in a vehicle.

Referring now to FIG. 5, the window 38 is to be left open about 6 inches to allow for a window-sealer (made of plexiglas or other type of weather resistant material) 46 to fill in the 6 inch opening. A 3 inch hole cut out of the plexiglas for the hose 7 from the air intake port 6 on the filtered positive pressure air unit 100 will go through the hole to accept outside air (dirty air 12). In another embodiment, an appropriately sized flanged bracket can be attached to the window-sealer 46 to accept the hose 7. The hose 7 will be sealed to the hole and the window-sealer 46 will be sealed to the window 38 and window frame to prevent leakage from outside the cab. This unit will fit on the seat 44 or the floor 56 of the cab 200.

Figure 6:
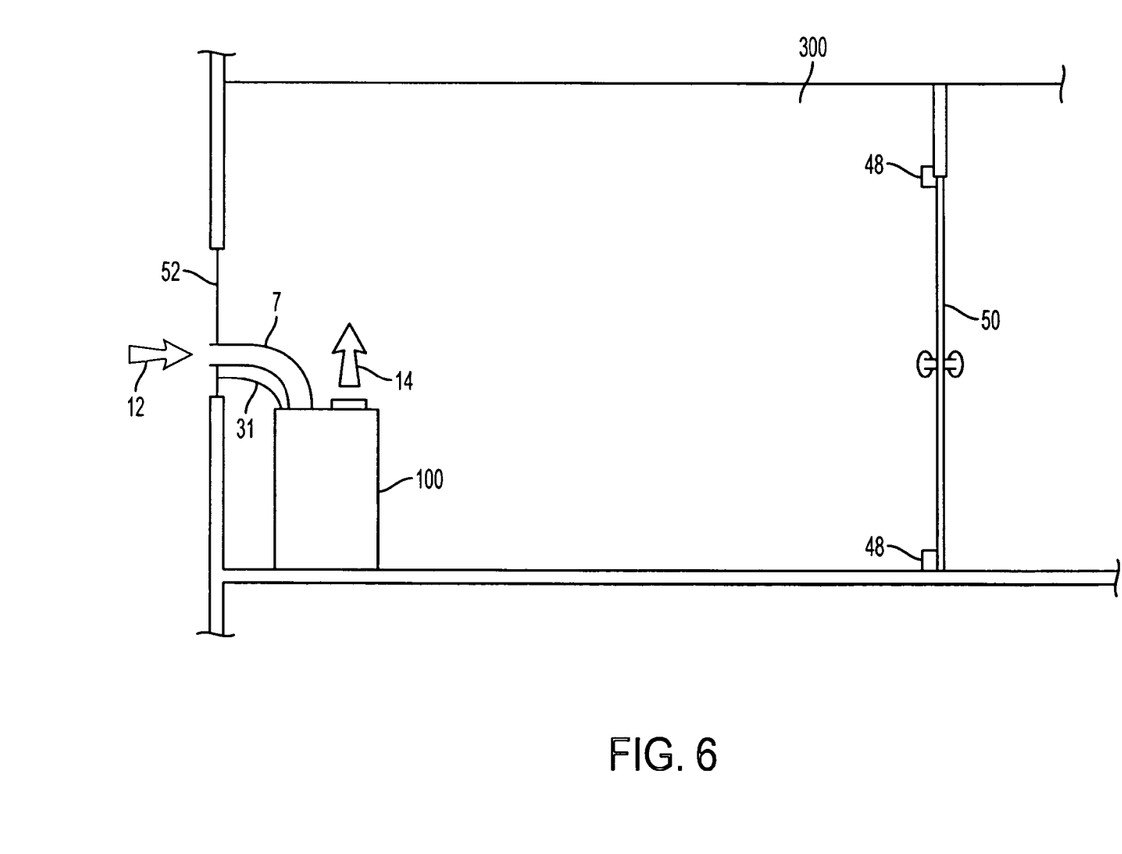
FIG. 6 illustrates a second exemplary use of the air filtration and positive pressurization system in a vehicle.

Referring again now to FIGS. 1-4, operation of the filtered positive pressure air unit 100 will be described. The filtered positive pressure air unit 100 can be conveniently located, if in a vehicle, on the seat or floor of the cab. If the filtered positive pressure air unit 100 is to be used inside a home or other structure, it should be placed in a room in which it is relatively easy to seal large openings. This is illustrated in FIG. 6. After the filtered positive pressure air unit 100 is appropriately located, the power cord 36 is plugged into the cigarette lighter outlet. For home use, the cord 36 will be a standard three prong grounded plug, and there will be a battery back-up (the battery back-up can be implemented in the embodiment shown in FIG. 5 as well). An operator will then turn on the filtered positive pressure air unit 100, and dirty air 12 (represented by darkened arrows in FIG. 2) will be drawn into the filtered positive pressure air unit 100 through the 3 inch hose 7. The dirty air 12 flows through the hose 7 into the intake ducting 4, through the HEPA filter 2, where it is filtered for particles. Filtration is accomplished to remove 99.97% of particles measuring 0.3 microns or larger. Clean air 14 (shown as white arrows in FIG. 2) leaving the HEPA filter 2 is drawn into the blower 8 and exhausted into the cab 200 creating positive pressure. The inside of the box 22 operates as a clean air chamber. The magnahelic gauge 10 measures the positive pressure inside the cab 200.

The embodiment illustrated in FIG. 6 will now be described in greater detail. In FIG. 6, safe room 300 is generally a small room, with a single ingress/egress point (door) 50, and one window 52. The filtered positive pressure air unit 100 is located close to the window 52, and cord 36 is plugged into the appropriate plug. As discussed above, the filtered positive pressure air unit 100 can use a battery back-up to operate the blower 8. Sealant 48 (duct tape is a commonly available and effective sealant) is applied to the larger, more visible openings around the door 50, and also to window 52 if necessary. A different embodiment of the window sealer 46 used in a vehicle can also be used in the safe room 300. As above, once all the sealant has been properly applied, and the filtered positive pressure air unit 100 is plugged in, it can be turned on. Dirty air 12 is drawn through the hose 7, where it is filtered by HEPA filter 2, and clean air 14 is blown out into the safe room 300 by blower 8. Positive pressure is measured by the magnahelic gauge 10, and is adequately maintained by the blower 8.

Figure 7A:
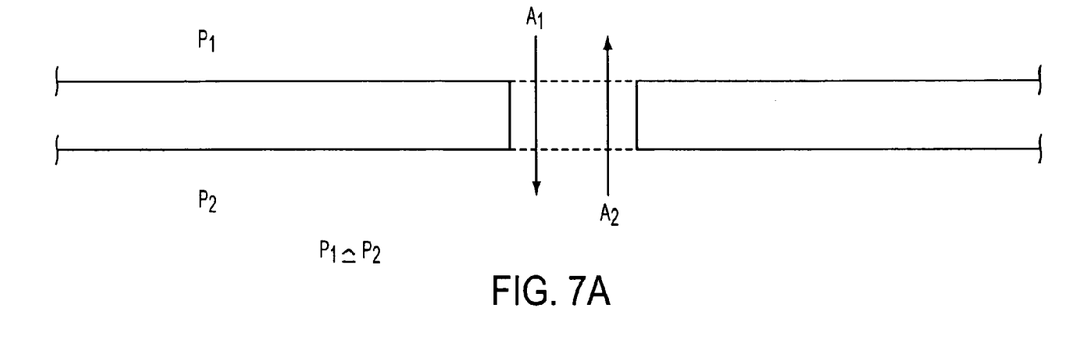
FIGS. 7A and 7B illustrate positive air pressure and its affect on a sealed environment.
Figure 7B:
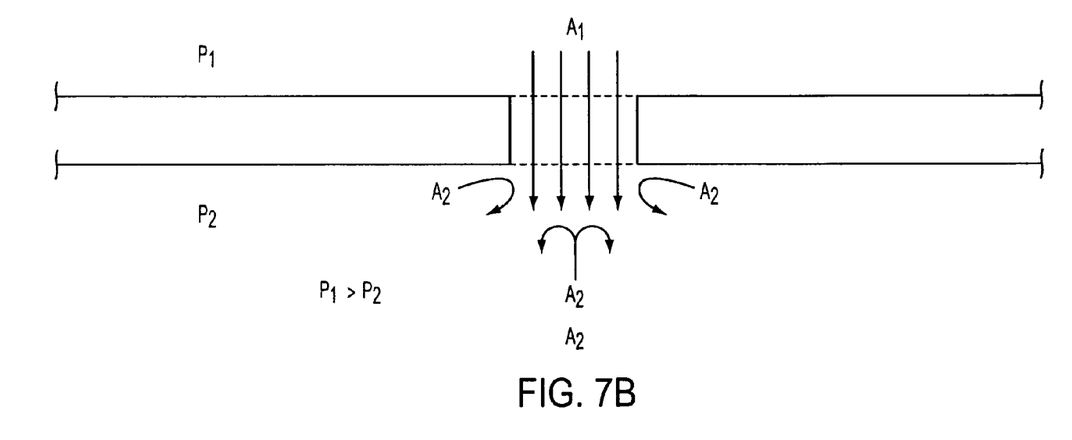

FIGS. 7A and 7B illustrate positive air pressure, and its effect on a sealed environment. Positive pressure is important because it is difficult, if not impossible, to ever seal all the holes in any environment, without spending extraordinary amounts of time and/or money. Certainly it is very important for spacecraft to be completely sealed, and in those limited circumstances it is appropriate and necessary to do so. However, in most terrestrial applications, a more advantageous and less costly method is to use positive air pressure to achieve the isolation between the external dirty environment, and the desired clean environment inside the enclosure. In theory, positive pressure is easy to obtain: more air has to be pumped into an enclosure than can be released through the existing exit points. As more and more air is pumped in, the pressure rises; at some point, the higher pressure is able to force enough air out the exit points so that it stabilizes the interior air pressure, providing the desired protection. In FIG. 7A, pressure P1 (interior) is equivalent to pressure P2 (exterior). Air A1 and A2 can easily flow between the two environments via the opening. In FIG. 7B, pressure P1 is raised so that it is higher than pressure P2; now, air A1 flows out of opening, and air A2 cannot enter the enclosure. If A2 represented dirty air 12, and air A1 clean air 14, the positive pressure of P1 being greater than P2 has made the enclosure of side 1 a safer environment, with respect to the "dirty" air 12.

While the invention has been shown and described with reference to certain embodiments thereof, it will be understood by those skilled in the art that various changes in form and details may be made therein without departing from the spirit and scope of the invention as defined by the appended claims.

I claim:

1. A self-contained, portable positive pressurization/filtering device comprising:
    an enclosed housing having an air inlet and an air outlet;
    a high efficiency particulate air (HEPA) filter within the housing adapted to capture substantially all particles in dirty air;
    an intake conduit coupled to said air inlet adapted to accept dirty air from an exterior environment and direct the dirty air to the air inlet of the housing;
    an exhaust port communicating with the air outlet adapted to exhaust substantially particulate-free clean air into an interior enclosed environment;
    a fan within said housing adapted to draw in the dirty air from the exterior environment, through the intake conduit and then through the HEPA filter, and exhaust the substantially particulate-free clean air to the interior enclosed environment at a rate sufficient to create a positive pressurization level with respect to an air pressure level of the dirty air in the exterior environment; and
    a pressure gauge for monitoring atmospheric pressure in the exterior environment and for monitoring air pressure in the enclosed environment, and where said pressure gauge operates the fan at a rate to maintain a positive air pressure in the enclosed environment relative to atmospheric pressure.

2. A portable, self-contained air filtering device for supplying filtered air to a closed environment comprising:
    a housing having an air inlet and an air outlet;
    a HEPA filter within the housing at a position between the air inlet and air outlet;
    a fan within the housing positioned on a downstream side of the filter with respect to a direction of air flow;
    an intake conduit having a first end coupled to said air inlet of said housing and a second end for drawing in air from outside the closed environment;
    a pressure sensor for monitoring air pressure within the closed environment and air pressure outside the closed environment and maintaining a positive pressure within the closed environment relative to the air pressure outside the closed environment; and
    a magnehelic pressure gauge having a positive pressure port communicating with the air in the closed environment and an ambient pressure port communicating with air outside the closed environment.

3. The filtering device of claim 2, wherein said ambient pressure port is connected to a first end of an ambient pressure tube, said ambient pressure tube having a second end at said second end of said intake conduit.

4. The filtering device of claim 3, wherein said ambient pressure tube is coupled to said intake conduit.

5. The filtering device of claim 4, further comprising a seal member coupled to said second end of said intake conduit, said seal member being adapted for fitting in an open window to seal the window.

6. A system for providing a controlled environment, comprising:
    a closed vehicle cabin structure defining a closed environment;
    a portable self-contained filtering device for supplying filtered air to the closed environment and maintaining the closed environment at a positive pressure to inhibit infiltration of unfiltered air, said filtering device comprising:
        a housing having an air inlet and an air outlet;
        a HEPA filter within the housing at a position between the inlet and the outlet;
        a fan within the housing positioned on a downstream side of the filter with respect to a direction of air flow;
        an intake conduit having a first end coupled to said air inlet of said housing and a second end connected to a window of the vehicle and open to ambient air outside said closed structure for drawing in unfiltered air;

a pressure sensor for monitoring air pressure within the closed environment and air pressure outside the closed environment for maintaining a positive pressure within the closed environment relative to the air pressure outside the closed environment.

7. The system of claim 6, wherein said pressure sensor is a magnehelic gauge.

8. The system of claim 7, wherein said magnehelic pressure gauge has a positive pressure port communicating with the air in the closed environment and an ambient pressure port communicating with unfiltered air outside the closed environment.

9. The system of claim 8, wherein said ambient pressure port is connected to a first end of an ambient pressure tube, said ambient pressure tube having a second end at said second end of said intake conduit.

10. The system of claim 9, wherein said ambient pressure tube is coupled to said intake conduit.

11. The system of claim 10, further comprising a seal member coupled to said second end of said intake conduit, said seal member being adapted for fitting in said window to seal the window.

* * * * *